United States Patent
Heldberg

(10) Patent No.: US 9,903,257 B2
(45) Date of Patent: Feb. 27, 2018

(54) THERMOSTAT VALVE FOR A COMBUSTION ENGINE

(71) Applicant: ILLINOIS TOOL WORKS INC., Glenview, IL (US)

(72) Inventor: Carsten Heldberg, Kirchlinteln (DE)

(73) Assignee: ILLINOIS TOOL WORKS INC., Glenview, IL (US)

(*) Notice: Subject to any disclaimer, the term of this patent is extended or adjusted under 35 U.S.C. 154(b) by 231 days.

(21) Appl. No.: 14/914,265

(22) PCT Filed: Jul. 14, 2014

(86) PCT No.: PCT/US2014/046569
§ 371 (c)(1),
(2) Date: Feb. 25, 2016

(87) PCT Pub. No.: WO2015/030944
PCT Pub. Date: Mar. 5, 2015

(65) Prior Publication Data
US 2016/0201546 A1 Jul. 14, 2016

(30) Foreign Application Priority Data
Aug. 29, 2013 (DE) .................. 10 2013 109 365

(51) Int. Cl.
*F01P 7/14* (2006.01)
*F01P 7/12* (2006.01)
(Continued)

(52) U.S. Cl.
CPC ...... *F01P 7/16* (2013.01); *F01P 3/20* (2013.01); *F01P 7/14* (2013.01); *F16K 11/08* (2013.01);
(Continued)

(58) Field of Classification Search
CPC ........ F01P 7/16; F01P 3/20; F01P 7/14; F01P 2007/146; F01P 7/167; F01P 7/042;
(Continued)

(56) References Cited

U.S. PATENT DOCUMENTS 3,254,673 A * 6/1966 Mackenzie ........... F16L 37/113
137/614.02
4,942,849 A 7/1990 Shelton
(Continued)

FOREIGN PATENT DOCUMENTS

CN 1536209 A 10/2004
CN 1944979 A 4/2007
(Continued)

OTHER PUBLICATIONS

ISR and WO for PCT/US2014/046569 dated Sep. 29, 2014.

*Primary Examiner* — David Hamaoui
*Assistant Examiner* — Syed O Hasan
(74) *Attorney, Agent, or Firm* — Hauptman Ham, LLP

(57) ABSTRACT

The invention relates to a thermostat valve for an internal combustion engine, comprising a housing having a plurality of cooling fluid connections and comprising at least two hollow valve elements, which are arranged adjacent to one another and are mounted in the housing so as to be rotatable about a common rotational axis, wherein the valve elements each have at least one opening which is formed in the region of their shell surface, wherein the openings can be connected selectively to one or more, of the cooling fluid connections of the housing by rotating the valve elements, wherein drive means are provided with which a first of the at least two valve elements can be rotated between two end positions, wherein a second of the at least two valve elements can be coupled selectively to the first valve element and decoupled from the first valve element, wherein in the state in which it is coupled to the first valve element the second valve
(Continued)

Figure 1:
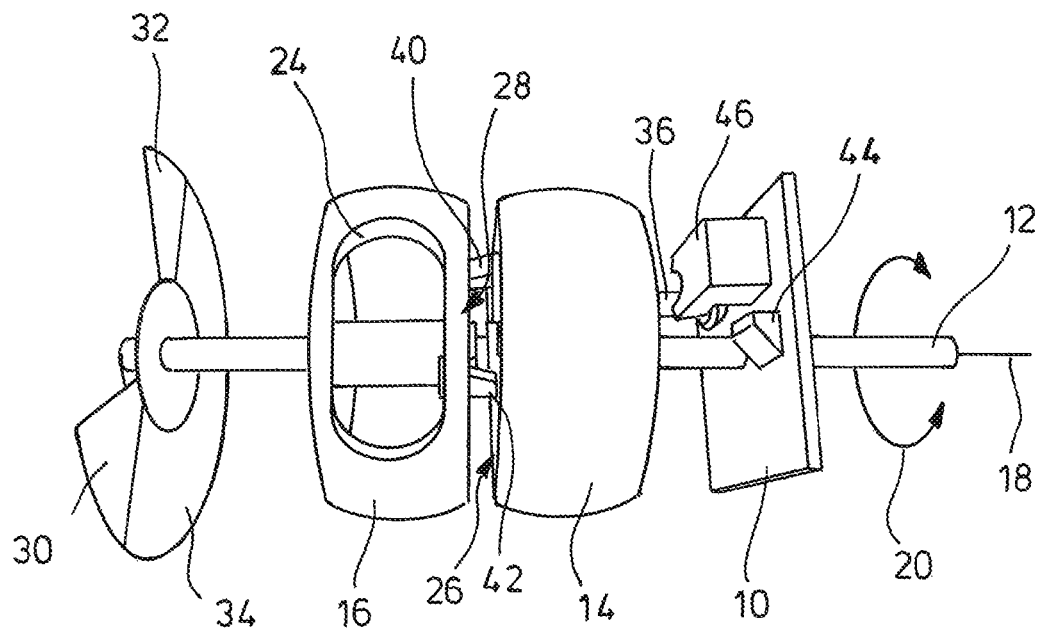

element is also driven in rotation by a rotation of the first valve element, and wherein coupling means are provided which are actuated by rotating the first valve element into the first end position, in such a way that the second valve element is coupled to the first valve element, and which are actuated by rotating the first valve element into the second end position in such a way that the second valve element is decoupled from the first valve element.

9 Claims, 5 Drawing Sheets

(51) Int. Cl.
    *F01P 7/16*     (2006.01)
    *F01P 3/20*     (2006.01)
    *F16K 11/16*     (2006.01)
    *F16K 11/08*     (2006.01)

(52) U.S. Cl.
    CPC ....... *F16K 11/165* (2013.01); *F01P 2007/146* (2013.01)

(58) Field of Classification Search
    CPC ... F01P 7/048; F01P 7/10; F16K 11/08; F16K 11/165
    USPC ................................ 123/41.08, 41.05, 41.12
    See application file for complete search history.

(56) References Cited

U.S. PATENT DOCUMENTS

| | | | | |
|---|---|---|---|---|
| 5,979,373 | A | * | 11/1999 | Sano ........................ F01P 7/167 |
| | | | | 123/41.08 |
| 6,457,652 | B1 | | 10/2002 | Fukamachi et al. |
| 2007/0079774 | A1 | | 4/2007 | Heldberg |
| 2010/0282190 | A1 | * | 11/2010 | Stoermer ............ F16K 11/0856 |
| | | | | 123/41.08 |
| 2013/0048084 | A1 | * | 2/2013 | Bartnick ................ F16K 11/165 |
| | | | | 137/1 |
| 2015/0286224 | A1 | | 10/2015 | Bartonek |

FOREIGN PATENT DOCUMENTS

| | | |
|---|---|---|
| DE | 102009004157 B3 | 4/2010 |
| EP | 1024257 A2 | 8/2000 |
| WO | 2014078255 A2 | 5/2014 |

\* cited by examiner

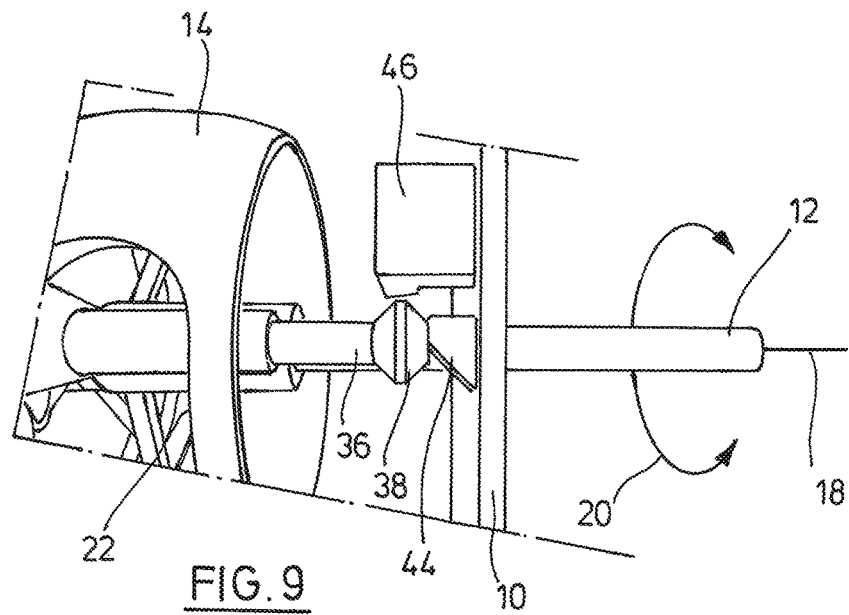
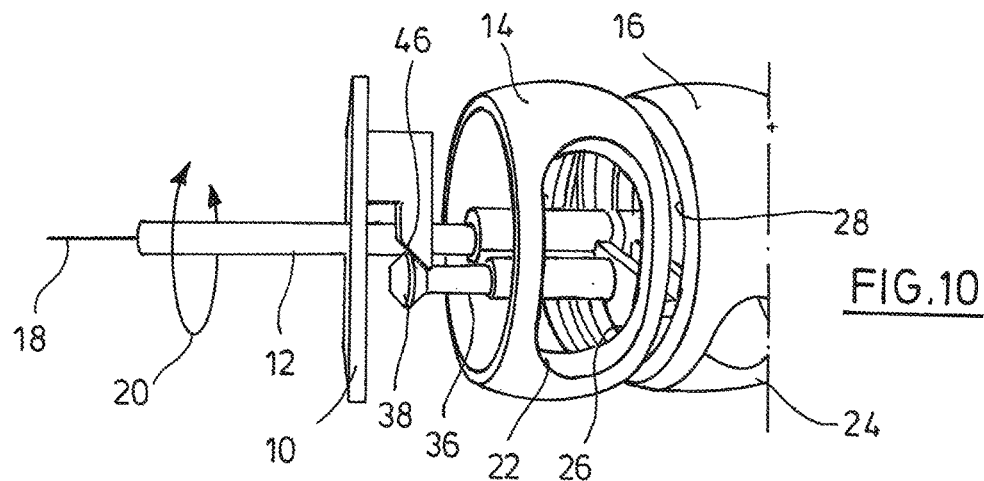
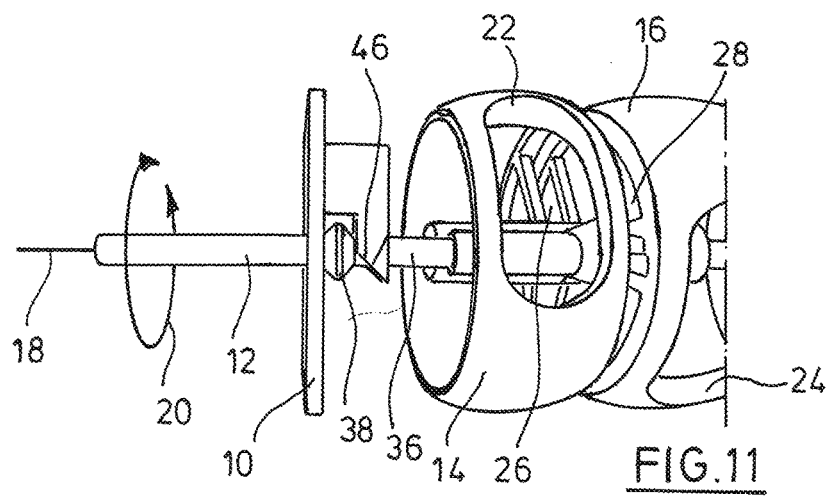

THERMOSTAT VALVE FOR A COMBUSTION ENGINE

RELATED APPLICATIONS

The present application is a National Phase of International Application Number PCT/US2014/046569 filed Jul. 14, 2014 and claims priority to German Application Number 10 2013 109 365.5 filed Aug. 29, 2013.

The invention relates to a thermostat valve for a combustion engine, comprising a housing with several cooling fluid connections and comprising at least two hollow valve elements which are arranged in the housing adjacent to one another and rotatably about a common rotational axis, wherein the valve elements each have at least one opening formed in the area of their shell surface, wherein the openings can be selectively connected with one or several of the cooling fluid connections of the housing through rotation of the valve elements, wherein drive means are provided with which a first of the at least two valve elements can be rotated between two end positions.

In order to perform open-loop and closed-loop control of the cooling fluid systems in the internal combustion engines of automobiles, nowadays a large number of different coolant circuits are set as a function of predefined operational values. For example, use is made of thermostat valves which are driven by electric motor and which are capable of controlling one or more cooling fluid paths. These thermostat valves use, as valve elements, for example, rotatable cylindrical or spherical-segment-shaped hollow rollers, referred to as rotary slides. In order, when necessary, to be able to actuate one or more additional cooling fluid circuits, for example a plurality of such rotary slides are coupled to one another in such a way that they lie on a common rotational axis. If, for example, a cooling fluid circuit is to be operated with or without cab heating of an automobile, it is possible, for example in the case of rotation in one direction, to control operation without the additional cooling fluid circuit, and in the case of rotation in the other direction the additional cooling fluid circuits can be controlled. For this purpose, a suitable control link guide can be provided between the valve elements.

It is, however, disadvantageous that in order to control the two cooling fluid circuits in each case only less than half the rotational circumference of the rotary slide can be used. Depending on the necessary switching states of the thermostat valve this gives rise to undesirably large diameters of the rotary slides.

Taking the explained prior art as a starting point, the invention is based on the object of making available a thermostat valve of the type mentioned at the beginning which permits a plurality of switch positions with as little installation space and in a structurally simple way.

The invention solves the problem by means of the subject matter of claim 1. Advantageous refinements can be found in the dependent claims, the description and the figures.

For a thermostat valve of the type mentioned at the beginning, the invention solves the problem in that a second of the at least two valve elements can be coupled selectively with the first valve element and decoupled from the first valve element, wherein the second valve element, when coupled with the first valve element, is also rotatably driven through a rotation of the first valve element, and wherein coupling means are provided which are actuated through rotation of the first valve element into the first end position such that a coupling of the second valve element with the first valve element is effected and which coupling means are actuated through rotation of the first valve element into the second end position such that a decoupling of the second valve element form the first valve element is effected.

The thermostat valve is provided for use in an internal combustion engine of an automobile. In this respect, the invention also relates to an internal combustion engine of an automobile with a thermostat valve according to the invention.

The valve elements provided according to the invention form what are referred to as rotary slides. They can be embodied, for example, in a hollow cylindrical fashion or hollow spherical shape. Accordingly, the valve elements can have a spherical-shaped or spherical-segment-shaped or cylindrical or cylindrical-segment-shaped shell surface. In each case one or more openings are formed in a manner known per se in the shell surfaces, said openings being bounded, in particular, by the shell surfaces. The openings can selectively open or close different cooling fluid connections of the housing and as a result connect them with one another or disconnect them from one another. The valve elements of the thermostat valve according to the invention are arranged adjacent to one another. In particular the valve elements can therefore switch selectively cooling fluid connections of the housing which lie adjacent to one another along the rotational axis of the valve elements, that is to say they can connect said cooling fluid connections to one another or disconnect them from one another. The cooling fluid connections of the housing form, in a manner known per se, passages to various cooling fluid lines of a cooling fluid system of the internal combustion engine. For example, the valve element, which is not driven itself, can open or close a cooling circuit circulation which has to be additionally controlled when necessary.

According to the invention, at least two valve elements are provided, wherein the valve elements can be selectively coupled to one another or decoupled from one another. One of the valve elements is driven in rotation and in the coupled state entrains the second valve element, which is, in particular, not driven itself. In the coupled state, the valve elements are, in particular, connected to one another in a rotationally fixed fashion, with the result that they are rotated together in both rotational directions. A synchronous movement of the coupled valve elements therefore takes place then. In contrast, in the noncoupled state the first valve element can be rotated independently of the second valve element, that is to say without rotation of the second valve element.

The coupling or decoupling of the valve elements takes place according to the invention in the opposing end positions of the rotational movement of the first valve element. In this case, rotation of the valve elements in the coupled or decoupled state is possible in the entire rotational range between the end positions. Only the end positions must not be approached unless a change in the coupling state is desired. Therefore, according to the invention a significantly larger rotational range is available for the control, that is to say for generating the desired opening geometries, than in the prior art, specifically virtually the entire circumference of the valve elements as rotary slides. As a result, with the same installation space it is possible to implement considerably more switching states than in the prior art.

The end positions of the first valve element can be adjacent to one another. The end positions of the first valve element can, in particular, also form end positions for the rotational movement of the second valve element. The rotation of the first valve element into the first or second end positions brings about actuation of the coupling means in order to couple or decouple the valve elements. The coupling or decoupling therefore takes place automatically when the first valve element is rotated into one of the end positions. There is no need for a separate drive for the coupling and decoupling. Instead, this can easily take place by means of the drive means which are provided in any case for rotating the first valve element. As a result, according to the invention the valve elements are coupled and decoupled in a structurally particularly simple way.

Of course, it is also possible to provide more than two valve elements. The further valve elements may or may not be driven themselves. In the latter case, they can also be driven by the drive means of another valve element, for example the first valve element.

According to one practical embodiment, the at least one first valve element and the at least one second valve element can be arranged on the sane rotational shaft.

Furthermore, the first valve element and the second valve element can comprise communicating axial openings, on their sides facing towards one another. Cooling fluid can flow front one of the valve elements into the other of the valve elements and therefore between cooling fluid connections, selectively connected by the two valve elements, of the housing via the axial openings which communicate with one another.

The end positions of the first valve element can be offset with respect to one another in the rotational direction of the first valve element by more than 180°, preferably by at least 270°. It is also possible for the end positions to be spaced apart by more than 270° in the rotational direction. As already mentioned, the entire rotational range between the end positions is available for the switching of the thermostat valve according to the invention without decoupling or coupling taking place. This available rotational range can be maximized by means of a large distance between the end positions in the rotational direction.

According to a further embodiment, the carrier means are also provided which are designed to carry the second valve element after decoupling from the first valve element in the second end position with the first valve element into an initial position close to the first end position wherein the first valve element is subsequently rotatable independently of the second valve element. Furthermore, the carrier means can comprise carrier projections provided on sides of the first and second valve elements facing towards one another, which carrier projections engage with one another upon a rotation of the first valve element from the second end position into the initial position close to the first end position. According to a further relevant embodiment it is possible to provide that the second valve element is held in the initial position through sealing means of a cooling fluid connection of the housing abutting on the shell surface of the second valve element, until the second valve element, upon a rotation of the first valve element into the first end position, is also rotated into the first end position through the carrier means and is coupled to the first valve element.

After the decoupling of the valve elements in the second end position, in these embodiments the second valve element is dragged back by the first valve element by means of the carrier means into an initial position close to the first end position and is, in particular, directly adjacent. In the initial position, there is no renewed coupling of the valve elements, with the result that the first valve element can subsequently be rotated in the rotational range between the second end position and the initial position independently of the second valve element. The carrier means therefore act only in one direction, specifically from the second end position in the direction of the first end position. If the valve elements are to be coupled again with one another, the first valve element is rotated as far as the first end position, wherein the carrier means then again entrain the second valve element out of the initial position to the first end position, with the result that the coupling takes place. In order to prevent, in a particularly simple way, the second valve element from moving out of the initial position in the state in which it is not coupled to the first valve element, it is possible to provide as explained that in the initial position sealing means of a cooling fluid connection of the housing abut against the shell surface of the second valve element and hold it in the initial position until it is dragged out of the initial position into the first end position by the first valve element and the carrier means.

According to a further embodiment it can be provided that the coupling means comprise a coupling pin which is provided axially moveable on the first valve element or the second valve element, wherein the coupling pin, upon a rotation of the first valve element into the first end position is pushed, into a pin reception of the other of the first and second valve elements for coupling the second valve element with the first valve element, and wherein the coupling pin, through rotation of the first valve element into the second end position is retracted from the pin reception for decoupling the second valve element from the first valve element. In this respect it can also be provided that a pin head of the coupling pin engages in the area of the first end position of the first valve element with a coupling ramp provided on the housing which coupling ramp pushes the coupling pin into the pin reception, and that the pin head of the coupling pin engages in the area of the second end position of the first valve element with a decoupling ramp also provided on the housing, which decoupling ramp retracts the coupling pin from the pin reception. The decoupling ramp can be embodied in a jaw shape and can engage behind the pin head of the coupling pin in the second end position of the first valve element.

The coupling pin therefore engages, for the purpose of coupling, in a suitable pin reception, for example a hole, in the respective other valve element. As a result, the two valve elements are connected to one another in a rotationally fixed fashion. In a particularly simple way, a coupling ramp can be provided on the housing, against which coupling ramp the pin head is pressed during a rotation of the first valve element into the first end position and by means of which coupling ramp the pin head then runs into the pin reception with axial displacement of the pin head. The decoupling by means of the decoupling ramp can take place in the corresponding way, wherein the ramp can be slotted in a jaw shape, such as what is referred to as a cow's foot. The jaw-shaped decoupling ramp grasps the pin head of the coupling pin, and the pin head is guided along the decoupling ramp while being pulled axially out of the pin reception.

According to an alternative embodiment it can be provided that the coupling means comprise a coupling rocker provided pivotably on the first or the second valve element, wherein the coupling rocker is pivoted through a rotation of the first valve element into the first end position such that it engages with a rocker reception of the other of the first and second valve elements for coupling the second valve element to the first valve element, and wherein the coupling rocker through a rotation of the first valve element into the second end position is pivoted such that, for decoupling the second valve element from the first valve element it disengages from the rocker reception. In this respect it can also be provided that in the first end position of the first valve element the coupling rocker engages with a coupling projection provided on the housing and pivoting the coupling rocker, and that in the second end position of the first valve element the coupling rocker engages with a decoupling projection also provided on the housing and pivoting the coupling rocker. In these embodiments, a coupling rocker is provided which, during a movement of the first valve element into the first or second end position, is pivoted in such a way that, by engaging with a rocker reception, it brings about coupling or decoupling of the valve elements.

In a manner known per se, the drive means can comprise an electric motor drive or a vacuum drive. Of course, in order to control the thermostat valve a suitable open-loop and closed-loop control device, such as is known per se, can be provided.

Figure 2:
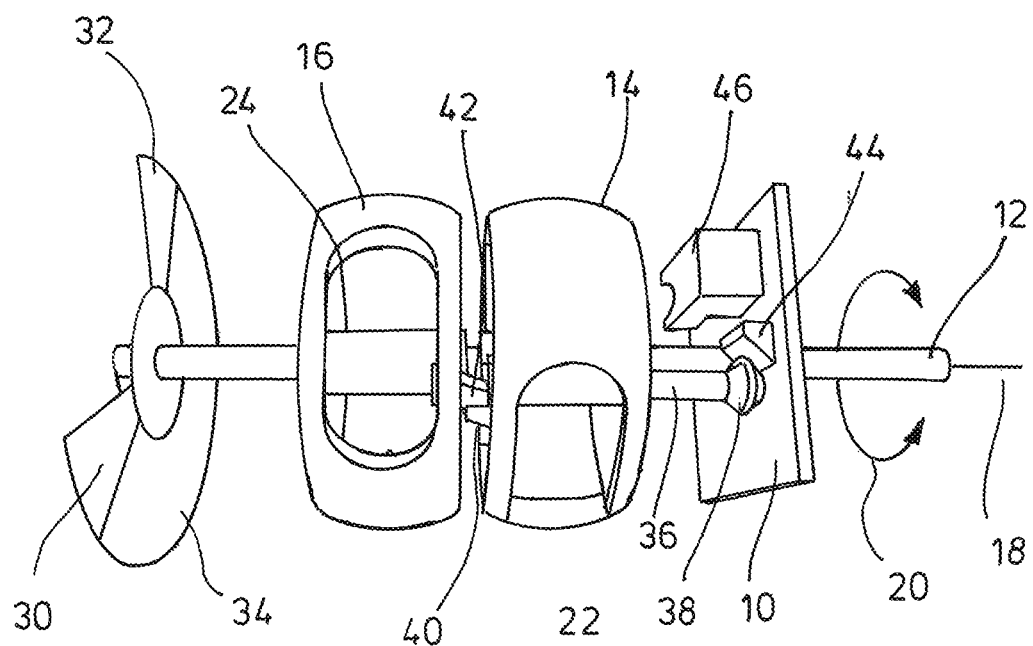
Figure 3:
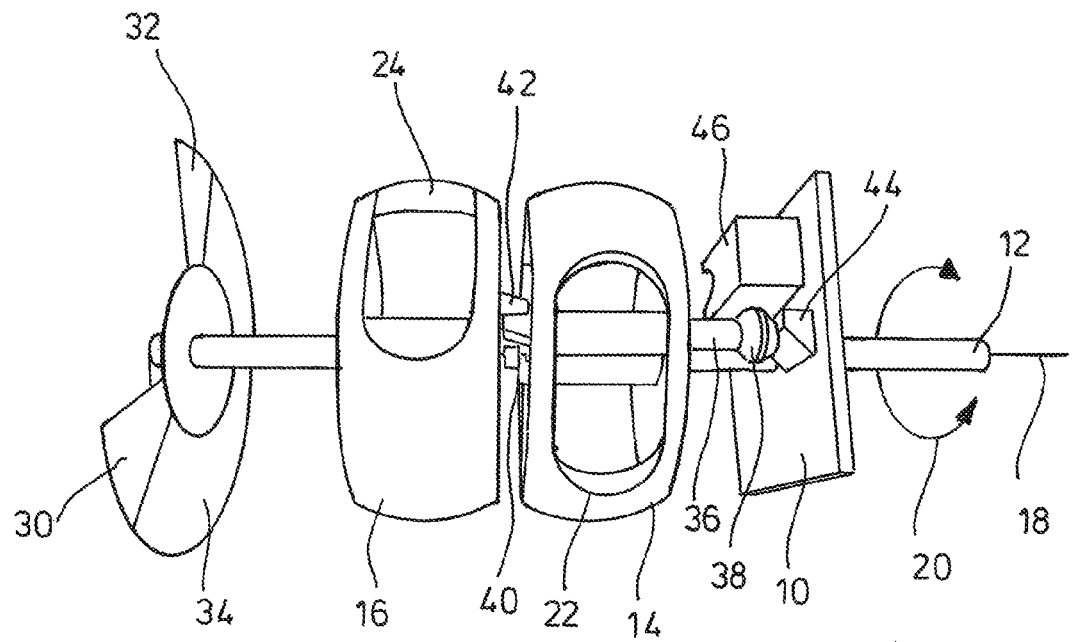
Figure 4:
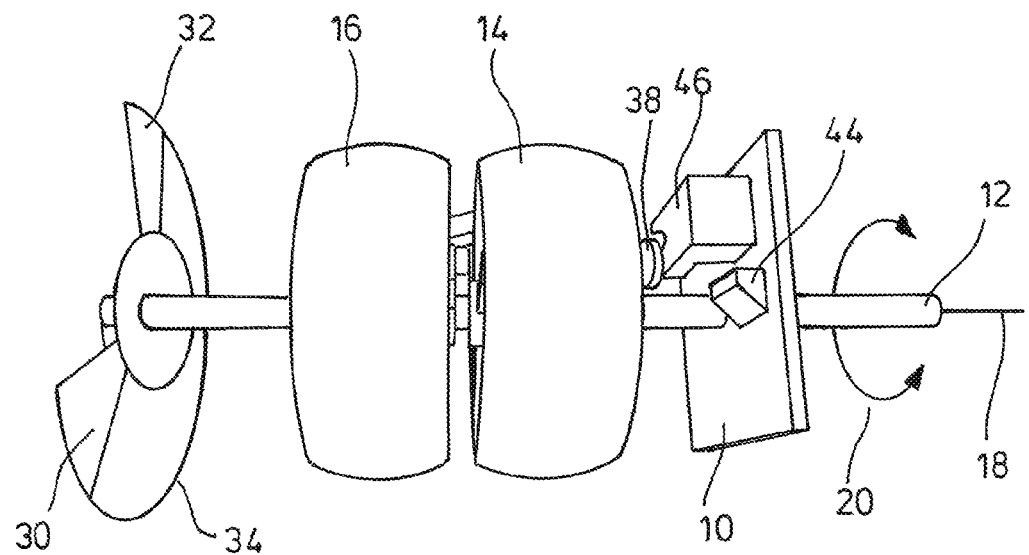
Figure 5:
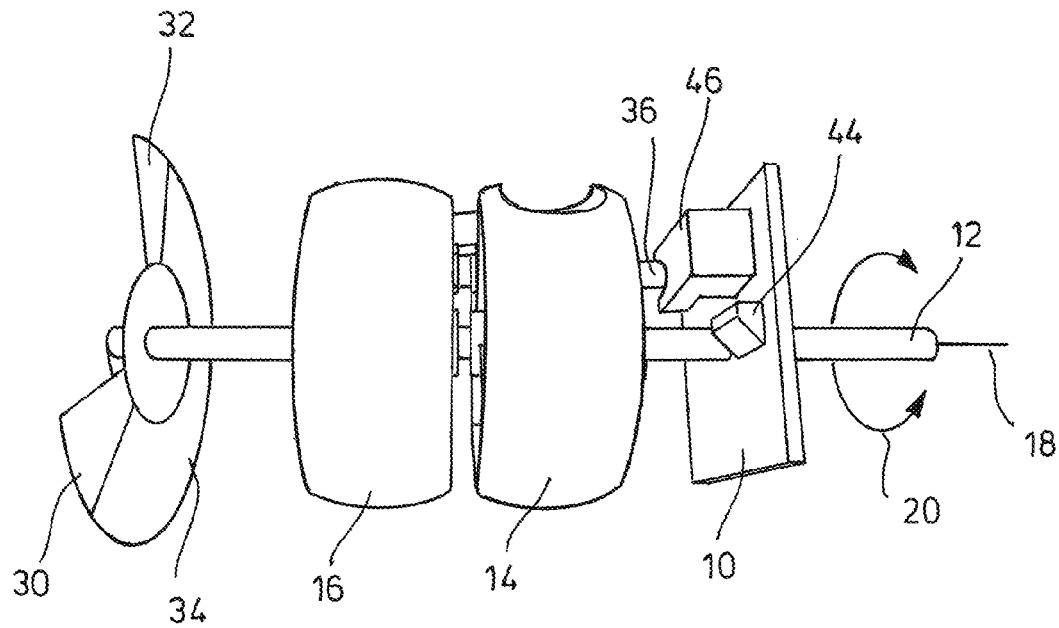
Figure 6:
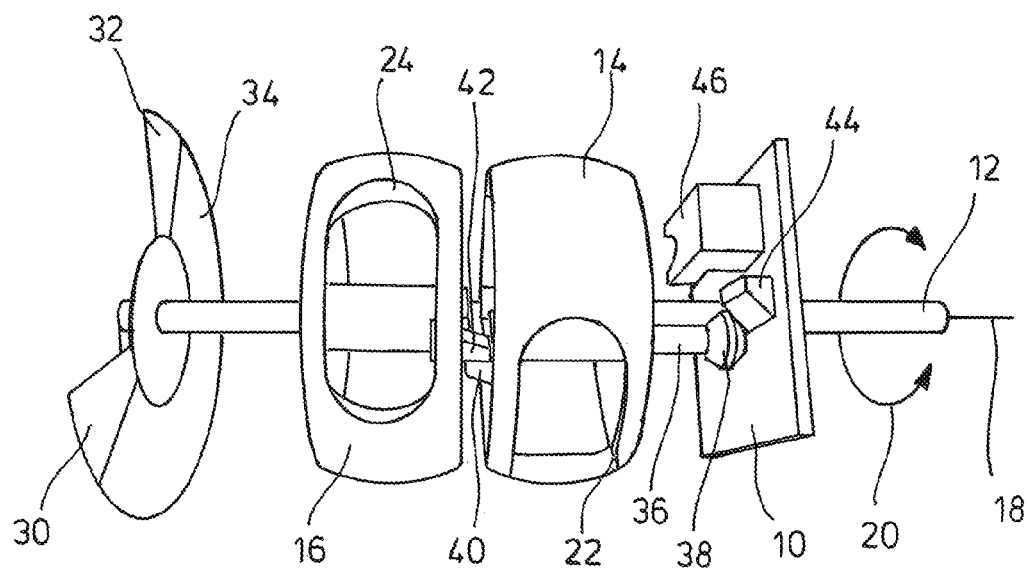
Figure 7:
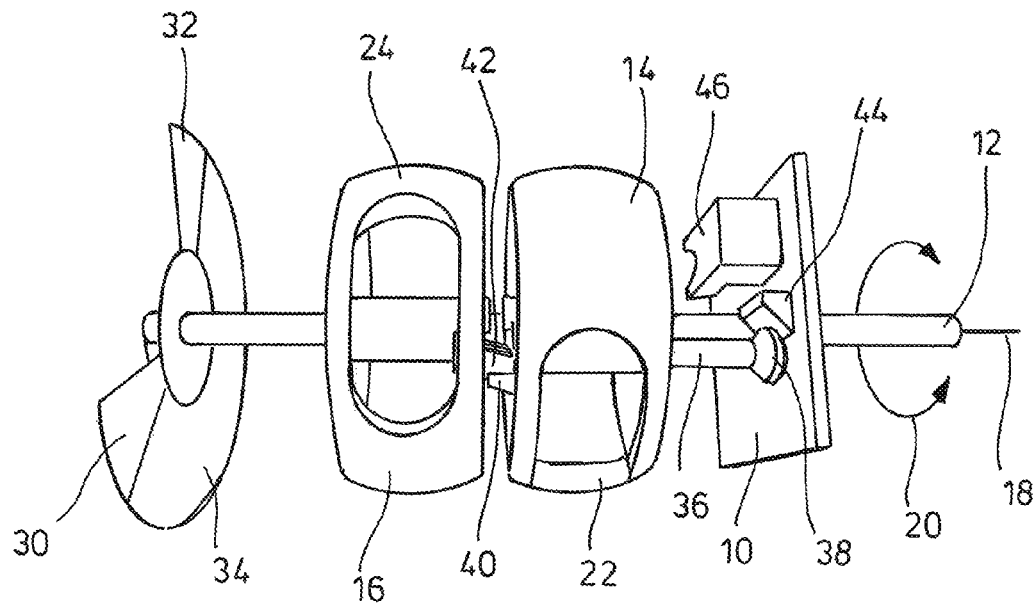
Figure 8:
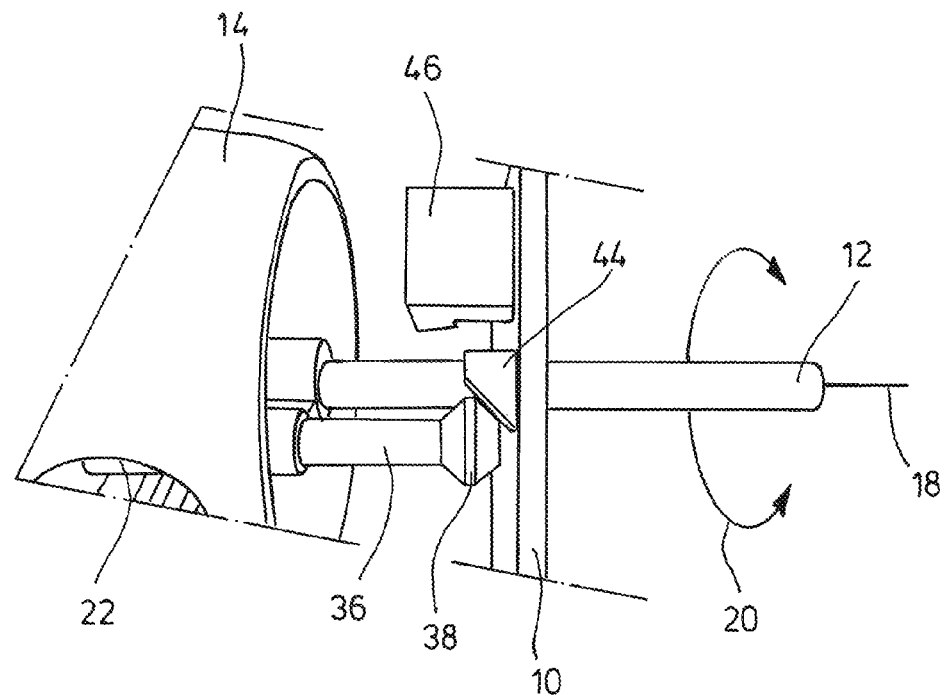

An exemplary embodiment of the invention is explained below in more detail with reference to figures. In the drawings, in each case in a schematic form:

FIG. 1 shows part of a thermostat valve according to the invention in a first operating state in a perspective view, FIG. 2 shows the illustration from FIG. 1 in a second operating state, FIG. 3 shows the illustration from FIG. 1 in a third operating state, FIG. 4 shows the illustration from FIG. 1 in a fourth operating state, FIG. 5 shows the illustration from FIG. 1 in a fifth operating state, FIG. 6 shows the illustration from FIG. 1 in a sixth operating state, FIG. 7 shows the illustration from FIG. 1 in a seventh operating state, FIG. 8 shows an enlarged detail of the illustration from FIG. 1 in a first operating state, FIG. 9 shows an enlarged detail of the illustration from FIG. 1 in a second operating state, FIG. 10 shows an enlarged detail of the illustration from FIG. 1 in a third operating state, and FIG. 11 shows an enlarged detail of the illustration from FIG. 1 in a fourth operating state.

Unless stated otherwise, identical reference signs denote identical objects in the figures. The thermostat valve according to the invention which is shown in FIG. 1 for an internal combustion engine of an automobile comprises a housing having a plurality of cooling liquid connections to cooling fluid lines of a cooling fluid system of the internal combustion engine. The cooling fluid system can have an open-loop and closed-loop control device, known per se, for performing open-loop and closed-loop control of the thermostat valve. The open-loop and closed-loop control device then receives measurement values of at least one sensor, which are the basis for the open-loop and closed-loop control. For example, one or more temperature sensors which measure the cooling fluid temperature can be provided.

For reasons of clarity, FIG. 1 shows only a portion 10 of the housing of the thermostat valve. A first valve element 14 and a second valve element 16 are arranged on a common rotational shaft 12. The first valve element 14 is fixedly connected to the rotational shaft 12. The rotational shaft 12, and with it the first valve element 14, can be rotated about a rotational axis 18, as additionally illustrated in FIG. 1 by the double arrow 20, by means of drive means, for example electric motor drive means, which are not illustrated in more detail. The second valve element 16 is also mounted on the rotational shaft 12 so as to be rotatable about the rotational axis 18. The first and second valve elements 14, 16 each have a spherical-segment-shaped shell surface and are of hollow design. The valve elements 14, 16 each have at least one opening 22, 24 which is bounded by the shell surface. The openings 22, 24 can selectively be placed in congruence with the cooling fluid connections of the housing in order to connect the respective cooling fluid lines to one another or disconnect them from one another. For this purpose, the first and second valve elements 14, 16 have, at least on their end faces facing one another, axial openings 26, 28 via which the cooling fluid can flow between the valve elements 14, 16.

A first end position of the rotational movement of the first valve element 14 is shown schematically with the reference symbol 30. A second end position of this rotational movement is shown schematically with the reference symbol 32. Between these end positions 30, 32 there is a rotational range 34. Approaching the first end positions 30 causes the valve elements 14, 16 to be coupled to one another. The coupled valve elements 14, 16 can subsequently be moved synchronously in both rotational directions within the rotational range 34 without the coupling being released. In order to release the coupling, the second end position 32 is approached. The valve elements 14, 16 are then decoupled and the first valve element 14 can be moved, after downward dragging, explained below, of the second valve element 16 into one of the first end positions 30 near to the initial position in the rotational range 34 without the second valve element 16. The end positions 30, 32 of the rotational movement of the first valve element 14 therefore also form end positions of the rotational movement of the second valve element 16.

The coupling and decoupling of the valve elements 14, 16 will now be explained in more detail with reference to FIGS. 1 to 7. In order to couple the valve elements 14, 16, a coupling pin 36, mounted in an axially moveable fashion on the first valve element 14, is provided with a pin head 38 at its one end. The end of the coupling pin 36, lying opposite the pin head 38, can be held in a corresponding pin reception of the second valve element 16. In this state of the coupling pin 36 in which it is held in the pin reception, the valve elements 14, 16 are coupled to one another in a rotationally fixed fashion by means of the coupling pin 36.

In FIG. 1, the first valve element 14 is in the second end position 32 and the coupling pin 36 is pulled out of the pin reception of the second valve element 16. The valve elements 14, 16 are therefore decoupled from one another. The second valve element 16 is in an initial position which is near to the first end position 30. Between the second end position 32 and the position shown in FIG. 2, the first valve element 14 can be rotated, driven by the drive means, independently of the nondriven second valve element 16 in this decoupled state of the valve elements 14, 16.

If the first valve element 14 is rotated into the position shown in FIG. 2, a carrier projection 40, formed on the end side, facing towards the second valve element 16, of the first valve element 14, engages in a carrier projection 42 which is formed on the facing end side of the second valve element 16. The second valve element 16 is also entrained in the decoupled state by the first valve element 14 as far as the first end position 30 by the carrier projections 40, 42. As is apparent from a comparison of FIGS. 2 and 3, the pin head 38 runs here over a coupling ramp 44 formed on the housing portion 10 and is as a result pushed in the axial direction into the pin reception of the second valve element 16. The valve elements 14, 16 are then coupled to one another in a rotationally fixed fashion and moved synchronously with one another in the rotational range 34.

FIG. 4 shows the state of the valve elements 14, 16 directly before the second end position 32 is reached. During further rotation of the valve elements 14, 16 into the second end position 32, the pin head 38 engages with a decoupling ramp 46 which is embodied in a jaw shape and which is also formed on the housing portion 10. In the process, the jaw-shaped portion of the decoupling ramp 46 engages behind the pin head 38 and guides the pin head along the decoupling ramp, wherein the coupling pin 36 is again retracted from the pin reception of the second valve element 16. This decoupled state is shown in FIG. 5. During subsequent rotation, the first valve element 14 entrains, owing to the carrier projections 40, 42, the second valve element 16 as far as the initial position close to the first end position 30, as illustrated in FIGS. 6 and 7.

The coupling in the first end position 30 by axially displacing the pin head 36 can be seen better in the enlarged illustrations in FIGS. 8 and 9. Correspondingly, the decoupling of the valve elements 14, 16 by axially pulling the coupling pin 36 out of the pin reception of the second valve element 16 can be seen better in the enlarged illustrations in FIGS. 10 and 11. In these figures the axial openings 26, 28 of the valve elements 14, 16 can also be seen better.

The invention claimed is:

1. A thermostat valve for an internal combustion engine, comprising a housing having a plurality of cooling fluid connections and comprising at least two hollow valve elements, which are arranged adjacent to one another and are mounted in the housing so as to be rotatable about a common rotational axis, wherein the at least two hollow valve elements each have at least one opening which is formed in a region of their shell surface, wherein the openings can be connected selectively to one or more of the plurality of cooling fluid connections of the housing by rotating the at least two hollow valve elements, wherein drive means are provided with which a first of the at least two hollow valve elements can be rotated between two end positions, wherein a second of the at least two hollow valve elements can be coupled selectively to the first valve element and decoupled from the first valve element, wherein in a state in which the second valve element is coupled to the first valve element, the second valve element is also driven in rotation by a rotation of the first valve element, and wherein coupling means are provided which are actuated by rotating the first valve element into a first end position, in such a way that the second valve element is coupled to the first valve element, and which are actuated by rotating the first valve element into a second end position in such a way that the second valve element is decoupled from the first valve element, wherein the coupling means comprise a coupling pin which is mounted in an axially displaceable fashion on the first valve element or the second valve element, wherein the coupling pin is pushed, via rotating the first valve element into the first end position in order to couple the second valve element to the first valve element, into a pin reception of the other of the first and second valve elements, wherein the coupling pin is pulled out of the pin reception by rotating the first valve element into the second end position in order to decouple the second valve element from the first valve element, and wherein, in a region of the first end position of the first valve element, a pin head of the coupling pin interacts with a coupling ramp which is formed on the housing and which pushes the coupling pin into the pin reception, and in a region of the second end position of the first valve element the pin head of the coupling pin interacts with a decoupling ramp which is also formed on the housing and which pulls the coupling pin out of the pin reception.

2. The thermostat valve as claimed in claim 1, wherein the first valve element and the second valve element are arranged on the same rotational shaft.

3. The thermostat valve as claimed in claim 1, wherein the first valve element and the second valve element have, on their sides facing one another, axial openings which communicate with one another.

4. The thermostat valve as claimed in claim 1, wherein the two end positions are offset with respect to one another in a rotational direction of the first valve element, by more than 180°, preferably by at least 270°.

5. The thermostat valve as claimed in claim 1, wherein carrier means are also provided which are designed to entrain the second valve element in rotation as far as an initial position which is near to the first end position after decoupling of the second valve element from the first valve element in the second end position, wherein the first valve element can subsequently be rotated independently of the second valve element.

6. The thermostat valve as claimed in claim 5, wherein the carrier means comprise carrier projections which are formed on sides of the first valve element and second valve element facing one another, said carrier projections being engaged with one another during a rotation of the first valve element from the second end position as far as the initial position which is near to the first end position.

7. The thermostat valve as claimed in claim 5, wherein the second valve element is held in the initial position by sealing means, bearing against the shell surface of the second valve element, of a cooling fluid connection of the housing, until, when the first valve element is rotated into the first end position, the second valve element is also rotated into the first end position by the carrier means and is coupled to the first valve element.

8. The thermostat valve as claimed in claim 1, wherein the decoupling ramp is embodied in a jaw shape and engages behind the pin head of the coupling pin in the second end position of the first valve element.

9. The thermostat valve as claimed in claim 1, wherein the drive means comprise an electric motor drive or a vacuum drive.

* * * * *